United States Patent [19]

Takacs et al.

[11] 4,282,101

[45] Aug. 4, 1981

[54] FILTERING APPARATUS

[75] Inventors: István Takács; Gyula Bosits; Endre Vereczkey; György Kerey, all of Budapest, Hungary

[73] Assignee: Richter Gedeon Vegyészeti Gyár Rt, Budapest, Hungary

[21] Appl. No.: 98,042

[22] Filed: Nov. 28, 1979

[30] Foreign Application Priority Data

Mar. 21, 1979 [HU] Hungary ................................ RI 699

[51] Int. Cl.³ .......................................... B01D 33/02
[52] U.S. Cl. .................................... 210/403; 134/153; 209/270; 209/290; 210/409; 366/220
[58] Field of Search ...................... 134/153, 159, 158; 366/220, 236; 209/288, 289, 290, 270; 210/402, 403, 409

[56] References Cited

U.S. PATENT DOCUMENTS

| | | | |
|---|---|---|---|
| 1,617,688 | 2/1927 | O'Tode | 209/290 |
| 1,631,517 | 6/1927 | Christel | 209/290 |
| 2,105,782 | 1/1938 | Lauth | 210/403 |
| 2,750,855 | 6/1956 | Lathrop | 210/403 |
| 2,942,731 | 6/1960 | Soldini | 209/270 |
| 3,381,944 | 5/1968 | Clary | 366/220 |
| 3,552,405 | 1/1971 | Apel | 134/153 |
| 3,754,559 | 8/1973 | Sciwert | 134/153 |
| 4,140,629 | 2/1979 | Martindale | 210/403 |
| 4,199,153 | 1/1979 | Martin | 366/220 |

Primary Examiner—Theodore A. Granger
Attorney, Agent, or Firm—Karl F. Ross

[57] ABSTRACT

A filtering and washing device has a filter body mounted in a housing for rotation about a horizontal axis and comprising a first portion in the form of a truncated cone or pyramid having a base plate with an eccentrically positioned polygonal orifice and a second portion in the form of a sawtooth-shaped tube rigidly connected at one end to the orifice and at an opposite end to a cylindrical drive shaft rotatably journaled in the housing and operationally connected to a motor, the tube in turn being formed from a multiplicity of hollow prisms or truncated pyramids. The first and second portions have surfaces provided with respective filter means. A pipe fixed to the housing traverses an end plate of the first portion opposite the base plate for rotatably supporting the filter body at one end and for feeding to the first portion material to be filtered or cleaned, while the tube is provided with an opening spaced from the base plate of the first portion for dispensing treated material. A multiplicity of articulated pipe sections extend through the drive shaft and inside the second portion for feeding a washing solvent thereto, filtrate from the tube being fed to the first portion via a collector, a conduit, a pump, a valve and a pipe coaxially disposed inside the feeder pipe. A further solvent-distribution pipe may be provided for washing outside surfaces of the filter body.

26 Claims, 10 Drawing Figures

| | L | A | B | C | D | E | X | Y | Z |
|---|---|---|---|---|---|---|---|---|---|
| I | 1320 | 300 | 400 | 400 | 220 | 0 | 300 | 160 | 0 |
| II | 1700 | 300 | 400 | 400 | 400 | 200 | 300 | 250 | 150 |

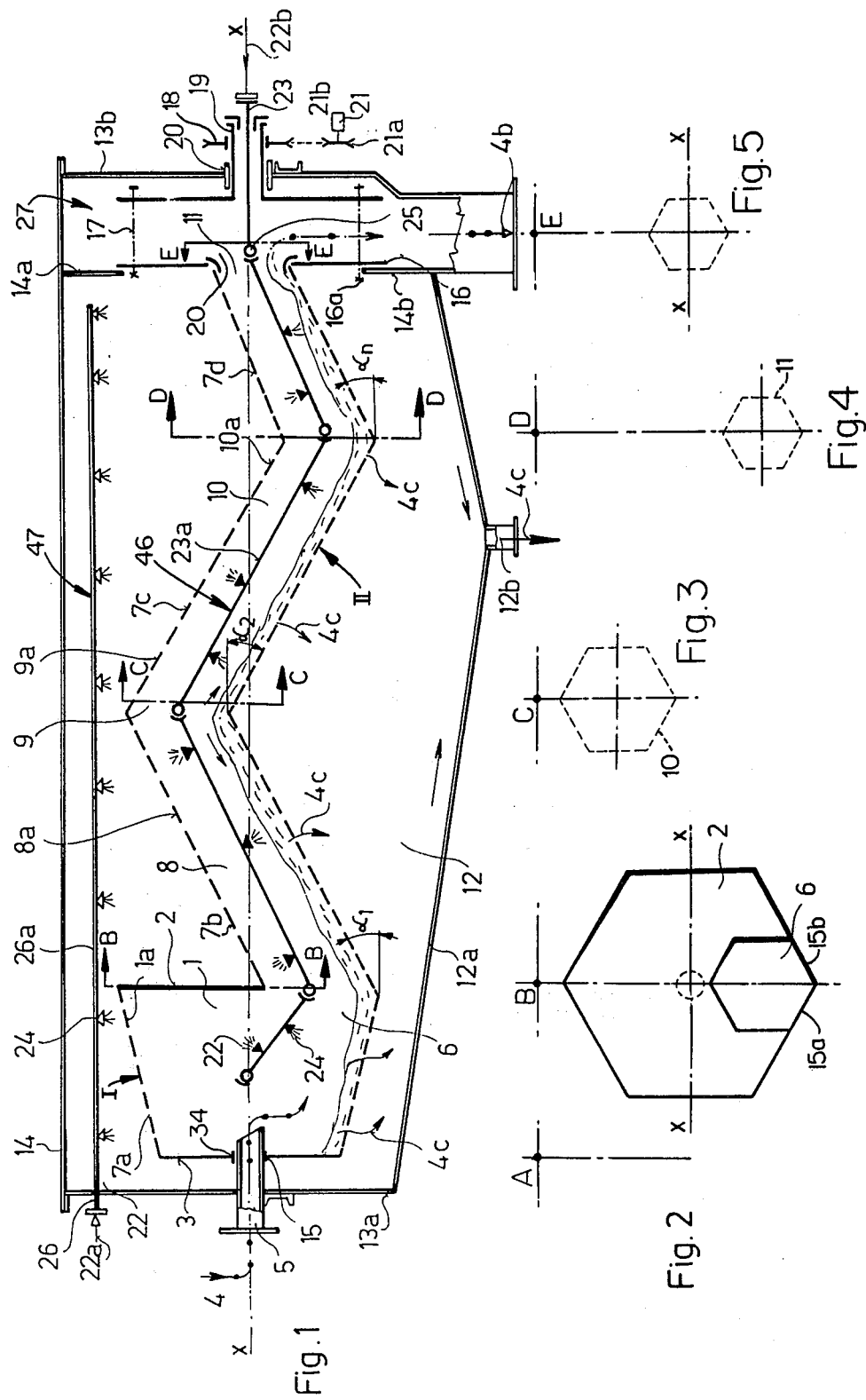

Fig.7
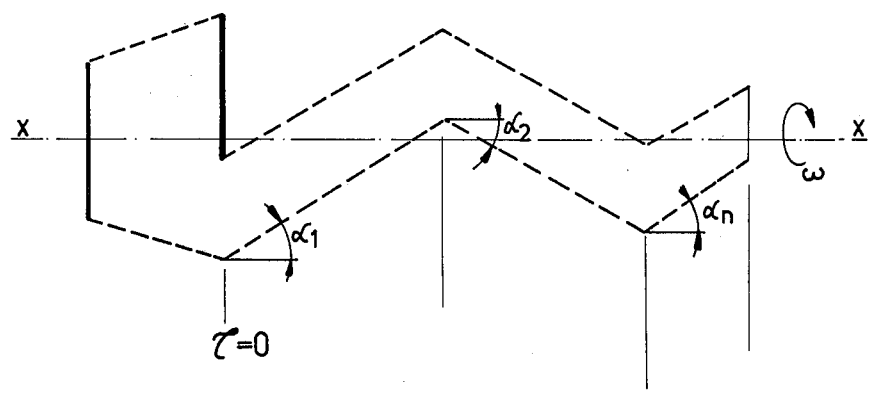
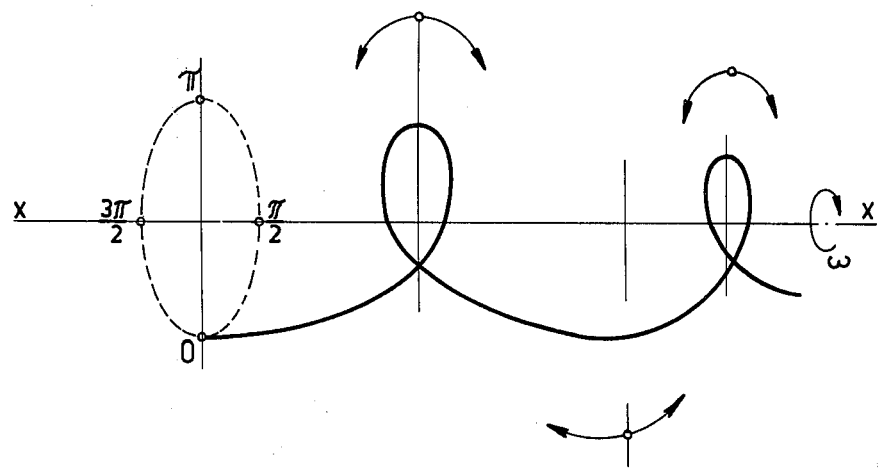
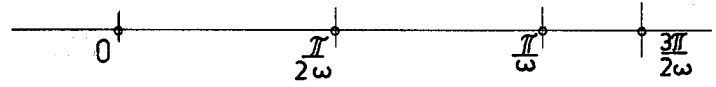
Fig.8

| | L | A | B | C | D | E | X | Y | Z |
|---|---|---|---|---|---|---|---|---|---|
| I. | 1320 | 300 | 400 | 400 | 220 | 0 | 300 | 160 | 0 |
| II. | 1700 | 300 | 400 | 400 | 400 | 200 | 300 | 250 | 150 |

FILTERING APPARATUS

FIELD OF THE INVENTION

The invention relates to apparatus for the filtering of pulps, suspensions or similar material, i.e. for the separation of liquid solid phases. The apparatus is provided with a rotary filter body having filter surfaces, devices for feeding the material to be separated by filtering into the interior of the filter body and devices for its removal from the equipment. The invention also relates to an apparatus for the cleaning of lumpy solid matter by washing, and/or for separation by washing out solid, lumpy, e.g. granular, fibrous or similar material from a wet mass of material, especially from a pulp material, which has a rotary filter body with filter surface; as well as devices for feeding the material to be treated (washing down, washing out) into the interior of the filter body and for the removal of the washed down and/or washed out solid matter and filtrate (e.g. impure washing liquid) from with regard to the fields of application of this invention, the concept of "lumpy, solid matter" should be interpreted in the broadest sense, i.e. to include fibrous materials.

BACKGROUND OF THE INVENTION

The liquid-solid phases of pulps and suspensions are industrially separated in various ways, i.e. the material can be filtered such that a completely clear condition of the outgoing liquid is not required, or the moisture content of the filtered solid matter may be relatively high. Such is the requirement for instance of the separation of coagulated grains from liquid derived from the denaturation of animal organs in the pharmaceutical industry, or with the filtering of lumpy, solid matter (fragments of cattle lung, extracted medicinal plant-particles, etc.) from the extract juice in the course of separating the solid-liquid phase (so-called first filtering) following the extraction of animal organs and plants.

In the food industry for instance skin particles and membranes are separated from juice for the production of fruit juice (e.g. in the first filtering of fruit juice) in order to increase the filtering capacity of the apparatus that filters the fruit juice until it is clean, and to reduce failure of the apparatus. The fast and simple filtering of lumpy solid matter has become increasingly significant for environmental protection.

Cleaning of the various agricultural products from the impurities before processing is necessary to avoid clogging of the processing equipment, untimely wear, and possible infection by the impurities. The cleaning prior to processing takes place with washing in washing machines. This is the simplest way to remove soil and remnants of spraying from the surface of the produce, as well as a considerable part of the substances capable of infecting the surface (e.g. as in the cleaning of potatoes prior to processing for distillation, in starch production, in preliminary washing of sugar-beet, tomato, fruits, etc.).

Valuable materials can be removed from the tissue or marc of the pulp derived from crushing of the agricultural products, and the tissue can be separately collected. For instance in potato starch production washing sieves are used to separate the starch of the pulpy potato from the marc.

Several methods are known for the gravitational first filtering of suspensions and pulps and for the simple extraction of liquid from the solid materials, some of which can be briefly described as follows:

Prismatic or cylindrical filters have a filter body with a slanting filter frame surrounded with flat plates, or with surfaces of revolution. This is rotated at uniform angular velocity. The pulp is admitted into the interior of the filter body. The filtrate passes through the filter, while the retained solid matter—as a result of the joint effect of rotation and slope—moves forward to the outlet.

In one of the variants of this equipment the sieve cylinder rotates in a semicylindrical trough. The pulp is admitted into the trough, from which the filtrate passes into the interior of the cylindrical filter body through the filter mantle of the latter, and from there is carried off through a pipe. The solid matter is removed from the exterior of the cylinder by a revolving brush extending into the trough. From there the solid matter is removed with the aid of a mechanical device.

Another group of the separators is represented by the flat filters. Depending on the method of moving the filter surface there are horizontal-, at an angle to the horizontal-, and rotary flat filters, as well as swinging-vibrating filters moving to and fro in vertical plane, on a circular, or elliptical path, or along a straight line.

The filter surface is suspended with a hinge at a low angle. The pulp is carried onto the filter surface, the filtrate passes through, while the retained solid matter slides to the outlet orifice. For cleaning the filter surface of the swinging-vibrating filters a screen with large holes is provided at a certain distances below the filter, the screen-carrying large diameter balls. As a result of the swinging-vibrating motion, the balls clean the surface by constantly knocking the filter surface from underneath.

For simple separations e.g., in sewage purification, various strainers (first filtering) are used, which are arranged horizontally or at an angle. The strainers can be curved (sweep filters). The pulp is carried to the upper part of the vertical slanting, or curved strainer. The filtrate passes through the strainer while the solid matter slides down on the sloping (curved) path to the mechanical discharge mechanism.

There are also skew-walled, filter bags which cooperate with a delivery worm in a lower rising part of the filter bag. The pulp passes into the space surrounded by filter walls on both sides, the filtrate passes off through the filter apertures, while the retained solid matter slides down on the flat wall and is removed by the worm.

Several methods are known for the washing-cleaning of solid lumpy materials and for the dewatering thereof:

One such washing machine has a horizontal trough with double bottom. The upper bottom is a semicylindrical perforated plate with several recessed stone traps. A shaft is provided with spiral arms running along the centerline of the washing machine. These arms carry the lumpy solid matter in the longitudinal direction of the machine. The washing liquid is drained into the trough, the liquid containing the impurities passes off through the perforated plate of the upper bottom to be collected in the lower bottom. The washed cleaned solid lumpy material is removed by the perforated baskets at the end of the shaft.

There are also washing mechanisms where the washing trough is divided into two or three parts in its longitudinal direction with cross walls. In this case the lumpy solid matter is carried from the inlet by the specially formed rotary arms by lifting from one cell into the next one. Each cell is provided with a separate water inlet and outlet so that the lumpy cleaned material is supplied with fresh washing liquid in every cell.

Another washing mechanism has a vertical cylinder in which the perforated rotary spiral surface lifts the lumpy material to be cleaned at uniform rate and meanwhile it is washed down by the liquid admitted from the top. The space required by this apparatus is relatively small.

A belt-conveyor type washing mechanism is generally used in the food industry. Here the material to be washed (e.g. soft, delicate fruit) is first passed under water, then the material emerges from the region of the sprinklers placed at the bottom and top. Next it passes into a perforated elevator to be washed again with clean water.

A rotary cylindrical washing mechanism is also known in the fruit-processing field in which the material to be washed is carried into the flowing washing liquid. The mechanical impurities (sand, etc.) fall through the holes of the drum, while the floating materials (e.g. stems, etc.) pass off on the water surface. For washing of hard fruits a conveyor-arm type washing mechanism is used, in which baffle plates rotate and carry the fruits. Soft fruits are washed and carried by flowing or injected water from the inlet to the outlet.

The more familiar washing machines for technological purpose, namely for the separation of the solid-liquid phases of pulpy materials, are the following:

A vertical cylinder mantle of a cylindrical washing sieve is covered with sieve cloth. A horizontal shaft fitted with arms runs through the machine. These arms lift up the pulp to be washed and guide it under the shower of the washing water. Here the pulp is washed over and falls back onto the sieve, the surface of which is cleaned with constantly rotating brushes. The water containing the valuable material (e.g. starch) passes through the sieve, while the hairy and fibrous tissues are retained to be carried off with the aid of a worm.

Cylindrical rotary sieves are also known which are similar to the centrifugal pump. The blades of the impeller are provided with an inlet screen. The pulp arrives through the tubular shaft onto the sieve plate and the liquid containing the valuable material passes through the holes of the rotary blades into the housing. The tissue remains on the sieve plate and, due to the effect of the centrifugal force they pass through the blades, moving off when the periphery is reached.

A frame of a vibrating washing sieve can be flexibly fixed (with the aid of springs). The to and fro motion and the vibrating motion are brought about by electrical-mechanical device. The surface of the sieve is divided into several fields, and the sieve surfaces slope toward the outflow. A shower is provided over every field and the liquid carrying the valuable material is retained by a tray at the bottom, while the tissue leaves the filter surface through the separately mounted channel.

The systems described above are used for specific filtering or washing task.

However simple equipment suitable effectively and with high capacity for filtering of sticky, solid materials from liquid, or dewatering without damaging the surface of the solid matter and without pressing it through the filter, has thus far not been known.

OBJECT OF THE INVENTION

It is the object of the invention to provide a simple apparatus which suitable for the filtering of pulps, suspensions, or similar material—e.g. sticky, greasy material, for the separation of liquid and solid phases in gravitational field and/or for the cleaning of lumpy solid materials by washing and/or separation from liquid.

SUMMARY OF THE INVENTION

The apparatus of the invention comprises a horizontally arranged filter rotating around a horizontal axis is divided into two parts such that the first part is a truncated pyramid, while the second part consists of several members and each member is prismatic and the mantle of both parts is covered with filter material. The parts are built together in such a way that the truncated pyramid of the first parts is symmetrically arranged around the horizontal centerline, and the first prismatic member of the second part joins the base of the truncated pyramid excentrically in relation to the horizontal axis, while the further members of the second part are connected with each other in sawtooth-like arrangement around the horizontal centreline.

A pipe is fitted inside and outside the truncated pyramid and prisms along the filter for admission of the washing water, so that the preliminary dewatering of the pulp takes place in the first part and discharge of the retained—still wet—solid material into the adjacent prism of the second part is ensured.

In the second part of the filter—through rotation of the sawtooth-like assembled prisms—the wet mass of material is forced through a two-directional, forward-backward movement, divided continuously on an apparently spiral path, as a result of which the residence time of the material in the filter and the specific surface of the filter are extended and thus dewatering of the solid mass of material is accomplished.

Discharge of the dewatered solid mass of material from the last prism of the second part—independently from the input fluctuation of the pulp—takes place at a uniform rate. In the first part soaking, washing and/or washing down with the admission of internal washing water is carried out, while in the second part besides the continuous separation, washing out of the valuable material is ensured.

With the use of external washing water the filter surface can be cleaned in a simple way. As a result, the liquid-solid phases of the suspensions and pulps can be continuously separated, predewatered in a gravitational field, the lumpy materials can be cleaned and the active ingredients can be rationally washed out of the pulp. One of two parts of the filter body has a horizontally arranged truncated pyramid of cone or frustum type filter drum shape rotatable around the horizontal or near horizontal geometrical symmetry axis, the side of which—at least in part—is formed by a filter.

The feeder pipe passes through the smaller end plate into the interior, while the larger end plate is provided with an orifice arranged eccentrically in relation to the symmetry axis and the second part of the body joins this orifice and has a minimum three oblong drum-like filter members leading into each other, the sides of which—at least in part—are formed by filter material and the geometrical symmetry axes of the filter members together form a sawtooth-like, or similar line intersecting the symmetry axis of the filter body outside the filter body, which symmetry axis is the common rotation axis of the filter body-part consisting of the filter drum and filter members.

It is advisable to install a washing mechanism in the filter body.

The equipment according to the invention for solving the washing out or washing down problem is provided with the aforementioned rotary filter body fitted with filter surface; devices for feeding of the treatable material (washing down, washing out) into the interior of the filter body and for removal of the washed down and/or washed out solid matter and filtrate (e.g. impure washing liquid).

According to a preferred embodiment of the invention the washing machine is provided with distribution pipes running along the geometrical symmetry axis of the filter members in the second part, connected with flexible swivel couplings to each other and equipped with spray heads or similar devices rotable together with the filter body, and the distribution pipe connected with swivel coupling to the distribution pipe of the filter member attached to the filter drum of the second part is located is the filter drum equipped at the end—in the interior of the filter drum—with swivel coupled spray heads or similar devices. The washing liquid is admitted into the internal washing mechanism through the distribution pipe farthest from the filter drum.

If a large quantity of washing water is required, it is advantageous to provide the equipment with a pipe leading into the filter drum for feeding of the major part—preferably about 80-90%—of the washing liquid to be conducted into the whole filter body, as well as with an internal washing mechanism separated from the washing mechanism in the second part, formed by a device suitable for spraying the washing liquid in the filter drum.

In this case the liquid feeder pipe is concentrically arranged within the pipe for feeding in the material to be treated and a curved baffle plate is located before the pipe-end in the filter drum and the pipe is equipped with a nozzle or similar device.

According to a further construction example of the invention the filter body is located in a trough-like housing, the bottom plate of which is shaped with a drop in the direction of minimum one spot, where a device, e.g. a pipe stub is fitted for discharge of the filtrate. If a large quantity of washing liquid is necessary, that embodiment is preferred in which the bottom plate of the house is shaped with a drop in the direction of two spots, one of which is located below the first part, while the other one is located below the second part of the filter body. Filtrate outlet orifices are provided at the deepest points of the bottom plate fitted with pipe stub, or similar device. Similarly in case of a large quantity of washing water a re-circulating pipe is provided for return of the filtrate from the bottom plate-part below the second part into the filter drum which is provided with pump.

The filter drum preferably is truncated pyramid and its cross section is a regular hexagon shape, and the shape of the filter member forming the second part is prismatic, suitably of regular hexagonal cross sections. End plates of the filter drum are preferably vertical.

Depending on the nature of the current technological task to be solved, the filter material is a grid and/or sieve and/or screen, where the filter plates are preferably replaceably mounted on the framework, so that construction of the filter element may vary even within the same equipment.

According to a further invention criterion the filter member as one of the filter members of the second part being farthest from the filter drum has an inlet into the drum or similar device being in rigid coupling and rotable with the filter body. The drum is provided suitably with vertical discs spaced from each other, the drum is located in the house, in a cell surrpunded with semi-circular walls on the side and with rear end plate at the end opposite the filter drum, while underneath it is provided with pipe stub or similar device emerging from the house and being suitable for discharge of the solid phase.

A central tubular shaft is fixed to the outer discs carried in bearings; preferably in the rear end plate of the house, a driving motor is connected to the filter body through a gear, chain, or chain wheel mechanism. The semi-circular walls surrounding the cell extend to the front of the inner disc of the drum and the material outlet orifice is centrally arranged in the inner disc.

Furthermore it is advantageous to provide the smaller end plate of the filter drum with a bearing, with the filter body rotating around the pipe used for input of the treatable material with the aid of bearing, the the axis of the pipe being preferably in the geometrical axis of rotation.

The advantages of the invention can be summed up as follows:

No constant and uniform layer of material can be developed in any part of the filter body, since—as a result of the filter body's rotation—the retained solid mattter partly slides back on the flat surface, and partly is forced into a multi-directional movement on the filter surface. Meanwhile the filter surface is constantly cleaned, continuously renewed. The equipment is self-cleaning, thus cleaning of the filter surface with additional operations, or devices is not necessary. As a result of these factors a given filtering task can be carried out in the apparatus according to the invention with less specific filtering surface than with the traditional filters.

The major part of the continuous separation, washing down, or washing out operations can be carried out in the first part of the filter body, while the final dewatering, washing down or washing out operations including the continuous and uniform discharge of the solid material can be accomplished in the second part. This means that a complex technological set of operations can be accomplished in the same equipment, for which different apparatuses were necessary up to now. Thus the space requirement of the equipment according to the invention is smaller, than that of any known production line of similar purpose and capacity, i.e. the specified liquid load (liter/min/m$^2$) of the filter surface may be higher than that of the presently known gravitational filters. Since separate and complicated solid matter removing and carrying devices are not necessary, the equipment is directly connectible with other apparatus for of continuous operation without a special feeder device.

Owing to the multi-directional movement of the filtered solid matter, the equipment exercises a buffer or compensating function as a result of which irregularities of the pulp feed are compensated.

The rotary filter body carries and discharges the material carefully. Consequently no solid material passes through the filter surface, it does not break, its surface remains intact. Thus the separation of pulps, suspensions, washing, cleaning of solid lumpy materials can be carried out in the equipment even when the undamaged condition of the solid matter in the course of its treatment is a fundamental requirement.

Depending on the quantity of the washing water, various technological (washing) tasks can be accomplished in the equipment. According to the construction of the filter as grid, screen or sieve, the major part of the separation, or washing down (e.g. 80-90%) can be quickly accomplished and the coarse impurities (soil, gravel, etc.) are instantly removable. Further washing can be carried out with the internal washing machine and during stand-down of the machine the dewatering of the cleaned solid matter is also realizable. Since the washing water drained from the second part is less polluted, it may be recirculated into the first part for the coarse washing, which is significant with respect to water economy.

The residence time of the solid matter is variable within wide limits, depending on the speed of the filter body, various geometrical dimensions and shape of the equipment, thus the most diverse technological tasks can be accomplished with the equipment.

BRIEF DESCRIPTION OF THE DRAWING

The invention is described below with reference to the accompanying drawing illustrating some of the embodiments of the equipment, as well as graphs. In the drawing:

FIG. 1 is a diagrammatic vertical section along the geometrical longitudinal symmetry axis of a preferred embodiment of the apparatus of the invention;

FIG. 2 is a cross section taken along line B—B of FIG. 1;

FIG. 3 is a cross section taken along line C—C of FIG. 1;

FIG. 4 is a cross section taken along line D—D of FIG. 1;

FIG. 5 is a cross section taken along line E—E of FIG. 1, omitting the housing and other parts as in FIGS. 2-4;

FIG. 7 is a schematic diagram of the filter part of the apparatus according to FIG. 1 in a smaller scale;

FIG. 8 is a schematic diagram showing the path of movement of the mass of material in the equipment shown in FIG. 7;

SPECIFIC DESCRIPTION

Figure 6:
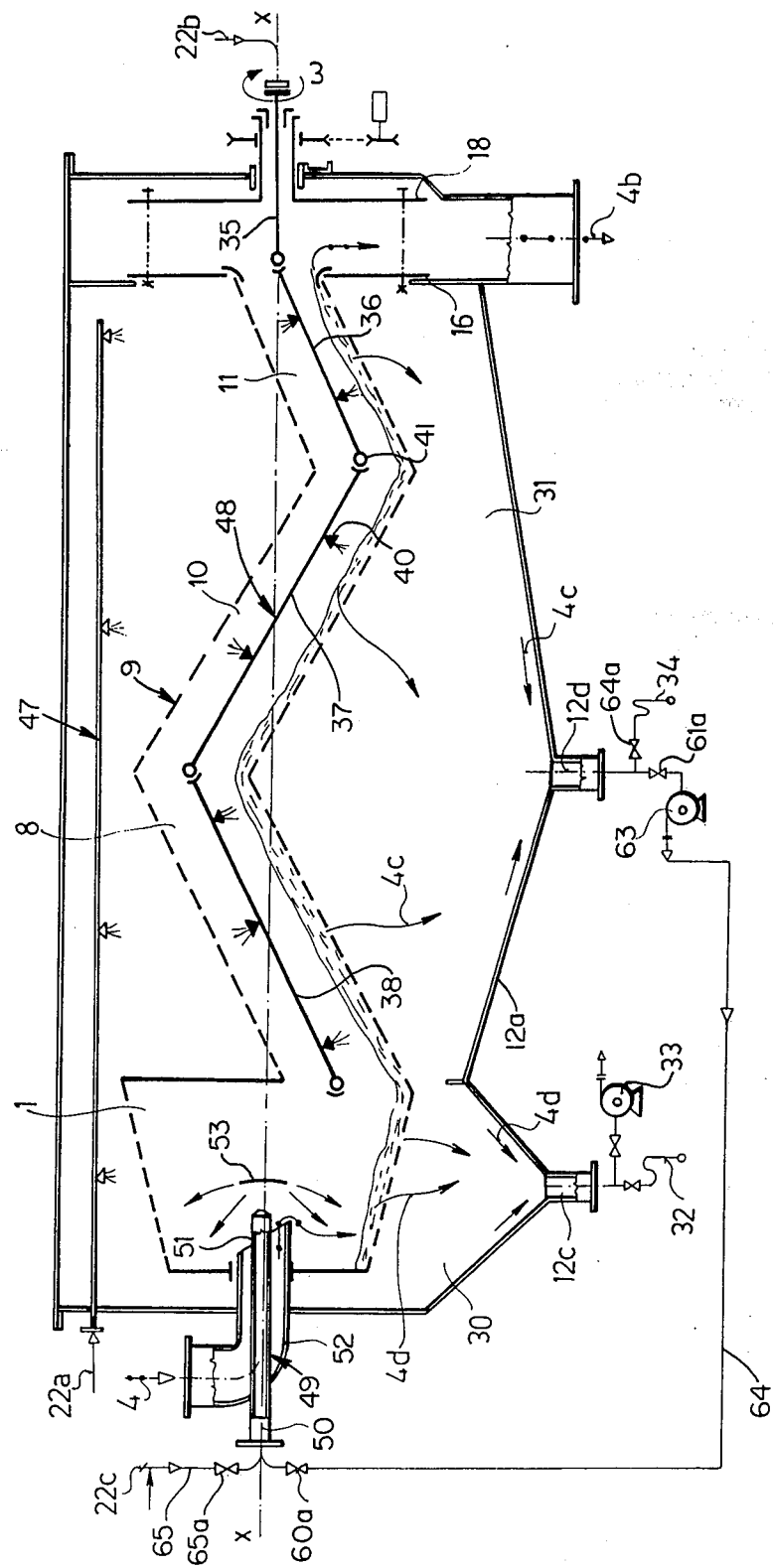
FIG. 6 is a diagrammatic vertical longitudinal section of an apparatus similar to that of FIG. 1.

FIGS. 1-5 show the housing 12 for a filter body, provided with a flat bottom plate 12a, end plates 13a, 13b, side walls (FIG. 2) and cover 14.

The bottom plate 12a forms a collecting tray. The filter body 8 is arranged in the housing 12.

It has two parts following each other along the longitudinal direction of the equipment: part I and part II. Part I has a horizontally arranged truncated pyramid shaped filter drum 1, while part II contains three prismatic filter members 8, 10, 11. The filter drum 1 and prismatic filter members collectively shown at 9 are in rigid coupling with each other and they have a common geometrical rotation axis (dot-dash in FIG. 1). Dewatering, filtering and washing out take place in the first part I, while the second washing down (washing out), dewatering and discharge of the solid matter take place in the second part II.

The smaller end plate 3 of filter drum 1 faces the end plate 13a of the housing 12, while the larger end plate 2 faces the interior of housing 12. The end plates 2, 3 are of regular hexagon shape. End plates 2, 3 are vertical, made of solid (non-perforated) flat plates.

A regular hexagonal orifice 6 is formed in the larger end plate 2 arranged excentrically in the end plate 2 in such a way, that the adjacent sides 15a, 15b coincide with the two adjacent sides of end plate 2 (FIG. 2).

Figure 10:
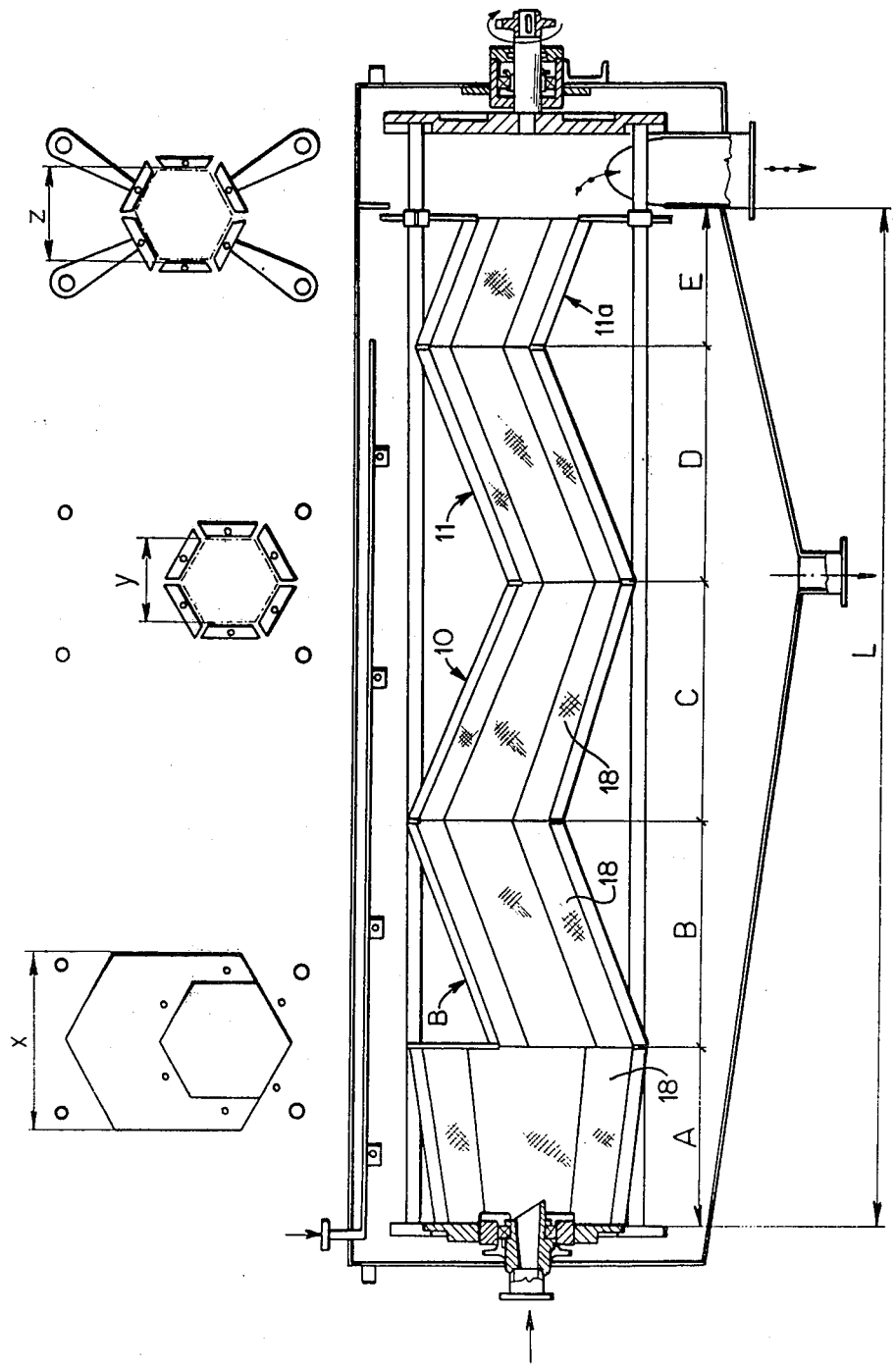
FIG. 10 is a view similar to FIG. 1 showing an embodiment with the filter body in elevation.

The cross sectional area of orifice 6 is a maximum of half of the cross sectional area of end plate 2 of the filter drum 1. Central orifice 15 is provided in the smaller end plate 3 of the filter drum 1, through which a pipe 5 extends into the interior of filter drum 1. Pipe 5 serves for the input of the material, e.g. pulp to be filtered or cleaned, through the end plate 13a of housing 12. Pipe 5 in addition to its function of feeding the material, serves as the mechanical—vertically arranged—rotation axis of the filter drum 19, fitting into the bearing 34 mounted onto the filter drum 1. The side plates forming the mantle surface of the filter drum 1,9 are—at least in part—composed of filter material 18 (see FIG. 10). The same type or similar filter 18 constitutes—at least in part—the mantle surface of the prismatic members 8, 10, 11. It is favourable if the filters consist of such filter plates which are replaceably mounted onto the framework of the filter drum or prismatic filter bodies.

The first prismatic filter member 8 of the filter body 9 in the second part II joins the orifice 6 of filter drum 1 in such a way, that its geometrical longitudinal axis $X_1$ is at an angle $a_1$ to the horizontal and it intersects the common horizontal geometrical rotation axis X outside the filter drum 1. The geometrical longitudinal axis $X_2$ of the next prismatic filter member 10 is at an angle of $a_2$ to the horizontal, while the geometrical longitudinal axis $X_n$ of the prismatic filter member 11 is at an angle of $a_n$ to the horizontal in such a way that the geometrical longitudinal axes $X_1$, $X_2$, $X_n$ together form a zig-zag or similar line. This way the geometrical longitudinal axes $X_2$ and $X_n$ also intersect the geometrical rotation axis X outside the filter drum 1. Thus the prismatic filter members 8, 10, 11 are connected with each other in sawtooth-like arrangement and naturally they have a common internal space.

The prismatic filter member 11 (or 11a) farthest from the filter drum 1 communicates over its total peripheral range 20 with a drum 17. The orifice 20 connecting the drum 17 and prismatic filter member 11 is centrally arranged in the drum.

Drum 17 is provided with discs 16 arranged with spacing k between each other and fixed with staybolts 16a to each other. The already mentioned orifice 2 is in the internal disc 16 to which the last prismatic filter member 11 (or 11a) is connected.

At the ends of housing 12 semi-circular walls 13b, 14b are provided fixed to the cover 14, or bottom 12a, extending toward the interior of the housing 12. The already mentioned drum 17 is located in this cell. The external disc of drum 17 has a central tubular shaft 19 is rigidly connected. Pipe stub 4b emerges from the cell 27 through which the solid matter is removed from the equipment.

The tubular shaft 19 is received in the end plate 13b of housing 12. Chain wheel 18 is mounted on the tubular shaft 19 and engages a driving chain passing through. The same chain is operated from a chain wheel 21a which is fixed onto the shaft of the electric driving motor 21.

Both the internal and external surfaces of the filters 18 of the equipment according to FIG. 1. can be washed down, or if the task is washing (cleaning) of the lumpy solid matter, or to wash out the granular or fibrous solid matter for instance from the pulpy material, then the internal washing mechanism is used for this purpose. The water for the internal washing is admitted through a pipe 22b leading through drum 17 into the distribution pipes 23, 23a running along the geometrical longitudinal axes $X_n$, $X_2$, $X_1$ of the prismatic filter members 11, 10, 8 as well as into the distribution pipe 22 traversing the interior of filter drum 1. Spray heads 24 are mounted on the distribution pipes 22, 23, 23a, connected with flexible swivel couplings 25 to each other. The whole internal washing mechanism is shown at 46. For external washing the water is conducted from the direction of arrow 22a over the filter body 1, 9 into the distribution pipe 26 running in the interior of housing 12. Spray heads 44 are fitted on this pipe. The whole external washing mechanism is shown at 47.

Pipe stub 12b emerges from the deepest part of the bottom plate 12a, through which the waste water (filtrate) can be removed from the equipment.

As shown in FIGS. 3-5., the cross sectional dimension of the prismatic filter members 8, 10, 11—while preserving the regular hexagon shape—is gradually decreasing from the filter drum 1 toward drum 17.

The embodiment of FIG. 6 is essentially the same as that shown in FIGS. 1-5. The apparatus of FIG. 6 serves for cleaning the lumpy solid matter by washing or washing out for instance solid granular and/or fibrous material from pulpy material. The internal washing mechanism consists of two parts: the washing mechanism 48 is in the prismatic filter members 8, 10, 11 of the filter body 9, i.e. in the second part—consisting of the distribution pipes 36, 37 and 38 and of the inlet pipe 35; the distribution pipes are fitted with spray heads 40, and the pipes are swivel connected 41 with each other. For internal washing of the filter drum 1—i.e. the first part—the washing mechanism marked with reference number 49 was allocated. This has a pipe 50 ending in nozzle 51 or similar device, which is conducted concentrically within the pipe 52 feeding in the pulp, in the interior of the filter drum 1. Curved baffle plate 53 is located before the nozzle 51. The longitudinal axes of pipes 50 and 52 coincide with the geometrical rotation axis X.

The bottom plate 12a consists of two trough-shaped parts and pipe stubs 12c, 12d emerge from the deepest points in downward direction. The bottom plate-part 31 is located below the second part II of the filter body 9, while the bottom plate-part 30 is below the filter drum 1, i.e. under the first part I, accordingly it is used for the separate collection of the filtrate coming from these parts.

The equipment according to FIG. 6 is used when larger amounts of washing water is required than in case of the equipment shown in FIGS. 1-5., and for this purpose the admission of the internal washing water is divided, taking place at two spots. The greater amount of washing water is admitted through pipe 50, because the greater part of the impurity separates on the surface of the filter drum 1. This more polluted washing water can be removed from the bottom 30 separately through pipe stub 12c into the canal 32, or carried to the place of processing with the aid of pump 33. The filtrate is carried off by pipes with gate valves built into them. The relatively less polluted filtrate (washing water) that flows out of the second part II of the filter body 9, passes off from the bottom 31 through pipe stub 12d and into the canal 34 by gravity into the recirculating pipe 64 with the aid of pump 63, this latter one leading into pipe 50. Gate valves 60a, 61a and 64a being provided. Pipe 65 containing the gate valve 65a for feeding in the clean washing water is similarly connected into pipe 50. For external washing the same type of washing mechanism 47 is allocated as in case of FIG. 1.

The apparatuses according to FIGS. 1-5., and 6 are of closed construction. The use of closed equipment is advisable when temperature of the pulp or suspension to be separated is such that vapours may be released from the liquid. In the closed combination the cover 14 prevents the flow out of the steam (vapor), it precipitates and flowing down on the side walls passes off together with the washing water (filtrate). Subsequent wetting of the dewatered solid matter passing into the drum 17 is prevented partly by the cover 14, and partly by the half rings whose inside diameter of these latter ones is less than the outside diameter of discs 16 of drum 17 built and rotating together with the filter body 1, 9 containing the prismatic members 8, 10, 11. The front surfaces of disc 16 and the half rings 14a, 14b slide over each other during rotation.

Operation of the equipment according to FIG. 1 is the following when the task is dewatering of pulp, a suspension or similar material, i.e. the separation of the liquid-solid phases by filtering:

the material carried through pipe 5 following arrow 4 in the interior of filter drum 1 forming the first part I of the equipment. The filter body 1, 9 is turned by the driving motor 21 at uniform angular velocity $\omega$ around the geometrical longitudinal axis X. Here a significant part of the liquid phase of the material passes off through the filter 18 forming the mantle (arrows 4c), and on the trough-shaped internal surface of the bottom plate 12a it flows to pipe stub 12b. The retained solid matter—the moisture content of which still may be considerable—slides down continuously on the internal surface of filter 18 to the hexagonal orifice 6. Thus a substantial part of the continuous separation of the solid matter from the liquid takes place in the first part I.

In the second part II, i.e. in the filter body-part containing the sawtooth-like arrangement of prismatic filter members 10, 11, and 12—as a result of the rotation around the geometrical longitudinal axis X—the wet mass of material arriving continuously from the first part I, divided continuously on an apparent spiral path is forced to a two-directional, forward-backward movement, at the same time it slides back on the flat surface from a certain height, and as a result of this multi-directional movement no material of constant and uniform thickness can develop either in the first part I or in the second part II of the filter body 8. Pattern of the movement of the mass of material in the filter body 8 is demonstrated in FIG. 8., where $\omega$ is the angular velocity of the rotation. With the described multi-directional movement the material cleans the internal surface of the filter 18 continuously, prevents its clogging, in other words the filter surface gets constantly renewed, thus the equipment is self-cleaning, hence cleaning of the filter surface is not necessary. Thus in the solution according to the invention—in comparison with a known equipment of similar purpose—specifically smaller filter surface is needed to obtain the same capacity.

Otherwise as a result of the multi-directional movement of the material, the dwelling period increases in the filter body 8, thereby increasing the efficiency of dewatering and the dewatering to the necessary extent may be completed in the second part during the long dwelling period.

Similarly as a result of the multi-directional movement, the equipment exerts a buffer effect (compensating effect). Owing to this, the incidental feeding troubles of the pulp or suspension are compensated, the equipment is not sensitive to the uneven feeding.

The above described task was merely dewatering, operation of the internal washing mechanism 46 and external washing mechanism 47 has not been taking place during the actual technological operation; the washing mechanisms are used only after completion of the dewatering for "washing down" the filters 18. (The internal 46 and external washing mechanism 47 may be used at the same time, or separately as well.)

If the task involves the washing down process of the polluted lumpy material (cleaning from impurity), or washing out the valuable solid (lumpy, e.g. granular, fibrous) materials from some kind of e.g. pulpy mass of material, then the equipment is operated as described above, and in addition the internal filter mechanism 46 is also operated at a continuous rate. In the first part I of the filter body 8—depending on the construction of the filter 18—which may be for instance sieve, screen or grid—a substantial part (even 80%) of the washing down or separation task can be accomplished and the immediate fast removal of the coarse pollutants (gravel, soil, etc.) can be accomplished with the aid of the distribution pipe 39 of the internal washing mechanism 46 and with the spray heads 40 mounted on it. In the second part II thereafter the further washing down or washing out operation i.e. the complete cleaning or separation is carried out with the water conducted through the distribution pipes 36, 37, 38 equipped with spray heads 40. On the other hand if the water supply is stopped, then the complete surface-dewateting of the solid matter can also be solved in the second part II.

For the solution of such tasks where large amount of washing water is necessary, the equipment according to FIG. 6 is used. The major part of the washing water is admitted into the first part I through the pipe 50 of the internal washing mechanism 49, since separation of the pollution and the decisive proportion of the valuable material takes place here. Admission of the clean water into the internal washing mechanisms 48 and 49 (the latter one runs through the second part) is marked with arrows a, feeding in of the material to be cleaned or washed with arrow c, water supply into the external washing mechanism 47 with arrow b, direction of the solid matter discharge with arrow e, and flow direction of the water flow through the filters 18 is marked with arrows d. Naturally less washing water is admitted through the washing mechanism 48 of the second part II. This passes off with substantially less pollution—after filtering and washing—through pipe stub 54, than the washing water flowing out through pipe stub 55 from the first part I, thus it can be used for washing or washing out in the first part I. The water passing off from the second part II is returned through pipe 64 into pipe 50 of the washing mechanism 49 in the direction of arrow f. This solution is water-saving, thus it is sconomical.

By variation of the geometrical parameters and speed of the equipment, various tasks can be solved as described in the following on the basis of FIGS. 7 and 8.

If angles $\alpha_1$, $\alpha_2$ and $\alpha_n$ are identical and of medium value, i.e. between 18° and 22°, that is if:

$$\alpha_1 = \alpha_2 = \alpha_n$$
$$\text{and}$$
$$18° < \begin{matrix}\alpha_1\\ \alpha_2\\ \alpha_n\end{matrix} < 22°$$

then the mass of material in the second part II of the filter body 9 formed by the sawtooth-like connected prismatic filter members 10-12 is being halved, while moving forward-backward on an apparent spiral path, and the dwelling period—depending on the number of prismatic members—is medium e.g. if number of the prismatic members is four, the treated material is not sticky and the speed $\omega = 40$ r.p.m., while the dwelling period is about 2-3 minutes. Such parameters are used when 80-85% of the dewatering or separation takes place in the truncated pyramid shaped filter drum 9 forming the first part I of the filter body 8, and no special after treatment or washing out is necessary.

If angles $\alpha_1, \alpha_2 \ldots \alpha_n$ are identical and their value is less than medium, i.e.:

$$\begin{matrix}\alpha_1\\ \alpha_2\\ \alpha_n\end{matrix} < 20°$$

the mass of material moving forward-backward is being halved, but the dwelling period of the material on the filter surface of the prismatic members is specifically longer, thus specifically longer time is available for the after treatment (e.g. washing out the valuable material) of the solid matter.

If angles $\alpha_1, \alpha_2 \ldots \alpha_n$ are identical and their value is higher than medium, i.e., $$\begin{matrix}\alpha_1\\ \alpha_2\\ \alpha_n\end{matrix} > 20°$$

the mass of maferial moving forward-backward is being halved, but movement of the solid matter on the filter surface of the prismatic members is more intensive than the average, thus self-cleaning of the surfaces is relatively more effective, more powerful, at the same time the dwelling period on the filter surface is specifically shorter.

If the angles are not identical, i.e.:

$$\alpha_1 > \alpha_2 > \alpha_n$$

is the relationship between the angle values, then the major part of the solid mass of material—regarding the direction of progress of the material—moves backward, and the lesser part forward, thus the specific dwelling period of the material will be longer. The use of such equipment is advisable when longer dwelling period is needed for separation of the solid-liquid phases of pulp or suspension, or for washing out the valuable material from the fibres of the fibrous pulpy material.

Operation of the equipment is responsive to variation of the cross section of filter members 10-12. If for instance the solid matter content of the pulp is not high, e.g. it does not exceed 20%, it is advisable to select the cross section of the prismatic filter members 10-12 to be different. If the cross sections are reduced in the direction of progress of material, as shown in FIGS. 2-5., then the primary purpose of the second part II of the filter body 8 is not separation, but its main task is the continuous discharge of the solid matter.

Figure 9:
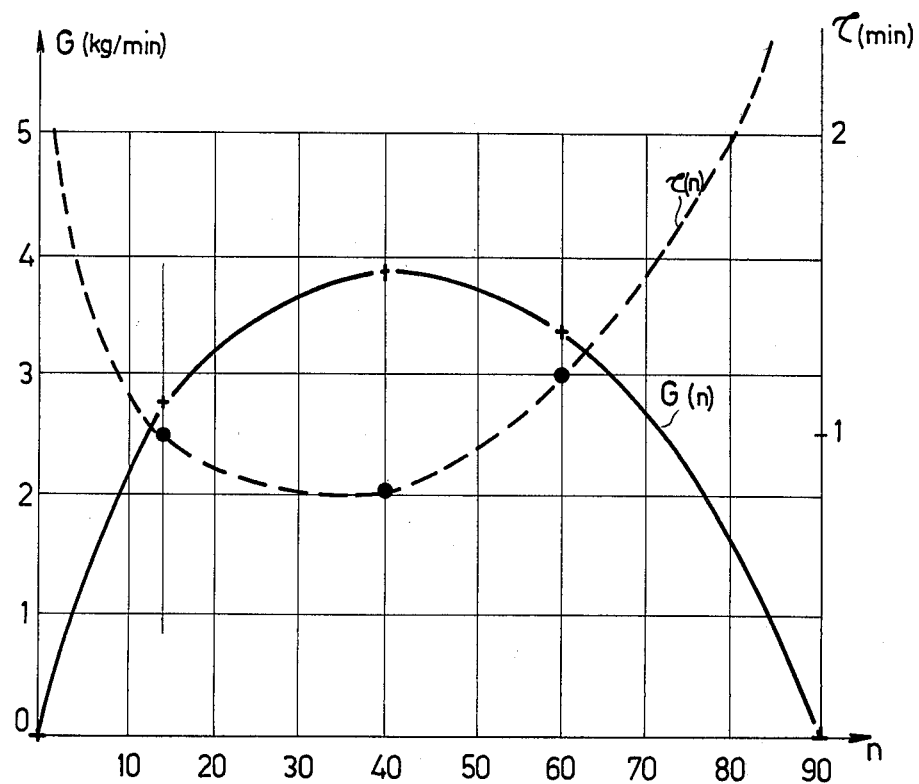
FIG. 9 is a graph showing the residence time of the solid matter in the apparatus as a function of the speed.

Dwelling period of the solid phase in the equipment depends on the variation of the speed of filter body 8. The relationship between the speed of the filter body, dwelling period of the solid matter and quantity of the solid matter passing out of the equipment is illustrated by the diagram shown in FIG. 9., for an equipment with giben geometrical parameters. Speed of the filter body is n/min in the diagram; $\tau$=dwelling period of solid matter (min); and $G_{out}$=quantity of solid matter passing out of the equipment (kg/min). In FIG. 9 it is apparent that in conformity with a certain concrete task, dwelling period of the pulp—including the solid matter—can be varied in a wide range by variation of the speed n.

It is noted that the separation characteristics shown in FIG. 9 were obtained as a result of operation of the concrete semioperated equipment. The characteristic data of this experimental equipment are given hereunder by using the symbols of FIG. 1.:

Maximum size (diagonal) of the end plate 14 of filter drum 9 forming the first part I and length of the first part I: 300 mm; maximum size (diagonal) of end plate 13: 240 mm, volume: 15.50 dm$^3$.

The second part II is constituted by three prismatic filter members, their cross section and area are identical, maximum size (diagonal): 160 mm; longitudinal projection of the first two prismatic filter members: 400 mm, that of the third filter member: 220 mm, thus length of the second part II is 1020 mm; full length of the filter body 8 (projected): 1320 mm; angles of inclination are identical, i.e. $\alpha_1=\alpha_2\alpha_n=20°$; speed n=30 r.p.m., filter surface 18 is acid resistant, with 0.8 mm mesh size; power output of driving motor: 2.2 kW.

The field of applicability has been clarified with this experimental equipment, at the same time the separation tests of several pulp varieties have been conducted having various material characteristics and different composition. The graph shown in FIG. 9. was obtained as a result of separation (dewatering) of such pulp in the experimental equipment the dry substance content of which is 3–15%, the solid matter is of 1–3 mm average grain size and rounded. With regard to the data of FIG. 6., dimensions, characteristics and the attainable results of the industrial equipment necessary for separation of materials identical with the material of the model are readily estimable.

In the following the invention is described in connection with some of the possible fields of application.

The colloidal solid substance content of sewages can be rationally recovered with the equipment according to the invention. Jelly-colloidal materials with protein content are derived from several plants, for instance for slaughterhouses, which after suitable pretreatment (chemical or physical) can be separated from the liquid, becoming further processible and separable from the liquid phase with the equipment according to the invention. Moisture content of the valuable material retained in the filters 18 can be reduced to minimum in the gravitational field and the wet solid matter can be dried in drying equipment.

Several fields are offerred also by the pharmaceutical industry for use of the invention. Such is for instance the treatment of the extracted organ scraps: offals of about 80% moisture content after extraction of the animal organs have to be collected partly for environment protection reasons, and parzly for the purpose of utilization. At the so-called skew-walled filter bag of gravitational and intermittent operation is used for the separation. For the economic further utilization the organ scraps obtained by extraction should be dried; for this purpose continuous separator is required. Separation of the organ fragments from the liquid derived as a result of the extraction with the equipment according to the invention, its feeding into the storage tank and/or drier can be solved with continuous operation and with small space requirement.

For separation of the extracted and/or solvent-free ground medicinal plant no solution exists at the present either with the intermittent extractors or with the U-extractors, thus the pulp passes into the sewage canal network without treatment. However this is detrimental to the sewage treatment, hence filtering of the plant parts would be necessary. The equipment according to the invention is suitable for solving the problem.

Rational processing of the offals of protein content or that of the other offals, and economic production of the highly nutritive meat meals are not solved in the slaughterhouses, at least not satisfactorily. With the equipment according to the invention the continuous filtering of the highly nutritive offals from the liquid and—as necessary—their feeding into further processing equipment at uniform rate, e.g. drier, can be solved. Otherwise the mechanical impurities (e.g. lumpy fibrous materials) can be continuously filtered out from sewages of other sources.

The equipment according to the invention can be used in the food industry too, for instance in the tomato processing, starch-, sugar production, fruit processing, fruit juice production.

The coarse surface impurities, substantial part of the surface contaimination are removed with washing in the course of tomato processing. This operation takes place in two parts (apparatuses) at the present: first the coarse impurities are washed down, then—in the second part—the whole surface is washed down. During the washing processes the tomato is conveyed as to prevent damage of the surface (e.g. belt conveyor in liquid, pneumatic conveyor etc.). This dual task can be accomplished in the equipment according to the invention with economic water utilization: the first washing is carried out in the filter drum 9 of the filter body 8, while the final washing (complete) takes place in the prismatic filter members 10-12. Special material conveyor, or discharge mechanism are naturally not necessary.

The starch from the potato-corn pulp (marc) at the present is recovered with apparatuses connected to each other in such a way that the coarse separation, i.e. recovery of the skin and tissues is carried out in the first apparatus, in the so-called cylindrical sieve (Bing-apparatus), while the starch is washed out of the filtrate with water in the second apparatus, on the so-called vibrator sieve. The coarse separation and washing out the starch can be equally accomplished in the equipment according to the invention.

The fruits are first washed prior to their processing from the mechanical impurities, as well as the microorganisms, moulds, bacteria sticking to the surface of the fruit should be removed, or at least their number is reduced as far as possible. In the equipment according to the invention not only the hard, but the softer more delicate fruits too are treatable; in the course of this treatment the mechanical impurities are washed down in the first part I, while the final washing is carried out in the second part II.

The sugarbeet—prior to its processing—is to be washed in soaking channel, or after some other kind of pretreatment. For this purpose at the present generally the so-called Wiesner-type washing machine is used, that consists of a washing trough with double bottom, sugarbeet conveyor, and removing device. With the equipment according to the invention—in case of suitably selected filter surface, e.g. grid construction—the washing task of the sugarbeet can be accomplished with higher capacity, smaller space and lower power requirement and with continuous operation.

LEGEND
Denomination of the reference numbers used in the attached drawings

| | | |
|---|---|---|
| 1 | - house | |
| 2 | - bottom plate | |
| 3 | | |
| 4 | | |
| 5 | | |
| | - side walls | |
| 6 | | |
| 7 | - cover | |
| 8 | - filter body | |
| 9 | - filter drum | |
| 10 | | |
| 11 | - prismatic filter members | |
| 12 | | |
| 13 | | |
| | - end plates | |
| 14 | | |
| 15 | - orifice | |
| 15a | | |
| | - sides | |
| 15b | | |
| 16 | - orifice | |
| 17 | - pipe | |
| 18 | - filter | |
| 19 | - orifice | |
| 20 | - drum | |
| 21 | - staybolt | |
| 22 | | |
| | - discs | |
| 23 | | |
| 24 | - ring fastener | |
| 25 | | |
| | - half ring walls | |
| 26 | | |
| 27 | - cell | |
| 28 | - tubular shaft | |
| 29 | - bearing | |
| 30 | - driving disc | |
| 31 | - driving chain | |
| 32 | - driving disc | |
| 33 | - driving motor | |
| 34 | - bearing | |
| 35 | - pipe | |
| 36 | - | |
| 37 | | |
| | - distribution pipes | |
| 38 | | |
| 39 | | |
| 40 | - spray heads | |
| 41 | - swivel coupling | |
| 42 | - pipe stub | |
| 43 | - distribution pipe | |
| 44 | - spray head | |
| 45 | - pipe stub | |
| 46 | - internal washing mechanism | |
| 47 | - external washing mechanism | |
| 48 | - washing mechanism | |
| 49 | - washing mechanism | |
| 50 | - pipe | |
| 51 | - nozzle | |
| 52 | - pipe | |

-continued
LEGEND
Denomination of the reference numbers used in the attached drawings

| | | |
|---|---|---|
| 53 | - baffle plate | |
| 54 | | |
| | - pipe stubs | |
| 55 | | |
| 56 | - pump | |
| 57 | - canal | |
| 58 | | |
| | - pipes | |
| 59 | | |
| 58a | | |
| | - gate valves | |
| 59a | | |
| 60 | | |
| | - pipes | |
| 61 | | |
| 62 | - canal | |
| 63 | - pump | |
| 64 | - recirculating pipe | |
| 64a | - gate valve | |
| 65 | - pipe | |
| 65a | - gate valve | |

What we claim is:

1. A filtering device comprising:

a horizontally elongated housing;

a filter body extending along said housing and disposed therein said filter body including:

an intake drum in the form of a frustum of polygonal cross section mounted in said housing for at least partial rotation about a substantially horizontal axis and having a polygonal small end plate proximal to one end of said housing and a polygonal large end plate spaced therefrom along said axis, said small end plate being provided with a first orifice concentric with said axis and said large end plate being provided with a second orifice eccentrically disposed with respect to said axis, said drum further having a surface provided with first filter means and joining a periphery of said small end plate to a periphery of said large end plate whereby said first filter means forms angularly adjoining walls of said frustum, and a generally zig-zag-shaped tube of linear tube sections rigidly connected at one end to said large end plate at said second orifice for communicating with said drum and rotatably supported near an opposite end of said tube by said housing, said arms having respective surfaces provided with second filter means, said tube having an outlet at an opposite end of said housing and being of polygonal cross section;

feeder means traversing said first orifice for conveying to said drum material to be filtered by said device;

drive means connected to said body for swinging same through at least a part of an arc about said axis;

washing means including a respective pipe section extending centrally along each of said tube sections and provided with spray nozzles, said pipe sections being joined in a generally zig-zag-shaped pipe connected to a source of solvent;

first transport means attached to said housing for collecting filtrate forced from said body through said filter means; and second transport means attached to said housing for collecting filtered material from said tube via said outlet.

2. The device defined in claim 1 wherein said drive means is constructed and arranged to rotate said body about said axis at a substantially constant angular velocity.

3. A device as defined in claim 1 wherein said pipe has a further pipe section traversing said second orifice and including a nozzle for supplying washing fluid to said drum.

4. The device defined in claim 1, claim 2 or claim 3 wherein said feeder means includes a feeder pipe traversing said first orifice, said washing means including an additional pipe coaxially surrounded by said feeder pipe at least in a region of said small end plate.

5. The device defined in claim 1 wherein said spray nozzles include spray heads swivelably attached to said pipe sections.

6. The device defined in claim 1, claim 2, claim 3 or claim 5 wherein said pipe includes a solvent intake at an end of said tube opposite said drum.

7. A device as defined in claim 1, claim 2, claim 3 or claim 5 wherein said source supplied water to said pipe.

8. The device as defined in claim 2 wherein said first transport means includes at least one trough disposed below said body and provided with a fluid outlet for the drainage of filtrate from said housing.

9. The device defined in claim 8 wherein said first transport means includes a first trough disposed below said drum and a second trough disposed below said tube, said troughs having respective outlets for the drainage of filtrate, further comprising a conduit extending from the outlet of the second trough to said drum for the recirculation of filtrate, a pump being inserted in said conduit for moving filtrate therethrough.

10. The device defined in claim 2 wherein said drum has the shape of a truncated pyramid and is hexagonal in cross-section.

11. The device defined in claim 1 wherein said pipe sections have hexagonal cross-sections.

12. The device defined in claim 2 wherein said second orifice is identical in size and shape to the end of said tube connected to said large end plate.

13. The device defined in claim 12 wherein said second orifice has a perimeter at least partially coinciding with a perimeter of said large end plate.

14. The device defined in claim 13 wherein said second orifice and said second large end plate are hexagonal, said second orifice having two sides at least partially coinciding with respective sides of said large end plate.

15. The device defined in claim 2 wherein said pipe sections are symmetric about respective symmetry axes, adjacent pipe sections being interconnected to have intersecting symmetry axes subtending a predetermined angle with respect to one another, said angle being the same in magnitude for any pair of adjacent pipe sections.

16. The device defined in claim 2 wherein said pipe sections are symmetric about respective symmetry axes, adjacent pipe sections being interconnected to have intersecting symmetry axes subtending a predetermined angle with respect to one another, said angle being greater in magnitude for a first pair of adjacent pipe sections than for a second pair of adjacent pipe sections disposed more closely than said first pair to said large end plate.

17. The device defined in claim 2 wherein said filter means include screens removably mounted on respective surfaces of said drum and said pipe sections.

18. The device defined in claim 2 wherein said drive means includes a drive shaft rotatably journaled in said housing and rigidly connected to said tube at an end thereof opposite said large end plate.

19. The device defined in claim 18 wherein said shaft is linked to said tube via a rigid coupling provided with egress means said housing having a cell at least partially enclosing said coupling and provided with an outlet, said opening communicating with said cell via said coupling whereby filtered material forced from said tube via said opening is guided to said outlet.

20. The device defined in claim 19 wherein said coupling includes a first member formed on said tube and a second member formed on said shaft, said members being interconnected by spacer bolts and extending perpendicularly with respect to said axis, said opening being substantially coplanar with said first member.

21. The device defined in claim 20 wherein said members are plates formed with substantially circular outer edges, said cell being substantially cylindrical and having an annular surface disposed on a side of said first member opposite said second member and said shaft and at least partially overlapping said first member for inhibiting filtrate from entering said cell.

22. The device defined in claim 21 wherein said opening is concentric with said first member.

23. The device defined in claim 18, claim 19, 20, 21 or 22 wherein said feeder means comprises a feeder pipe traversing said first orifice, said feeder pipe having a symmetry axis coinciding with said axis of rotation, said body being rotatably supported at one end on said feeder pipe.

24. The device defined in claim 1 wherein said end plates are oriented substantially perpendicularly with respect to said axis of rotation.

25. The device defined in claim 1, further comprising a solvent-distribution pipe disposed outside said body and formed with spray means oriented toward the body for the ejection of solvent.

26. The device defined in claim 25 wherein said solvent-distribution pipe carries water as a solvent.

* * * * *